United States Patent [19]

Göppinger et al.

[11] 4,160,797
[45] Jul. 10, 1979

[54] PROCESS FOR THE DEPOSITION OF POLYCRYSTALLINE SILICON FROM THE GAS PHASE ON HEATED CARRIERS

[75] Inventors: Alois Göppinger; Rudolf Griesshammer; Helmut Hamster, all of Burghausen; Franz Köppl, Altötting, all of Fed. Rep. of Germany

[73] Assignee: Wacker-Chemitronic Gesellschaft für Elektronik-Grundstoffe mbH, Burghausen, Fed. Rep. of Germany

[21] Appl. No.: 725,223

[22] Filed: Sep. 22, 1976

[30] Foreign Application Priority Data

Apr. 27, 1976 [DE] Fed. Rep. of Germany ....... 2618293

[51] Int. Cl.² .................... B29C 13/00; B29C 1/02
[52] U.S. Cl. ..................... 264/81; 264/173; 264/219; 264/221; 264/313
[58] Field of Search ................. 264/81, 173, 219, 221, 264/313; 427/51

[56] References Cited

U.S. PATENT DOCUMENTS

| | | | |
|---|---|---|---|
| 2,960,425 | 11/1960 | Shermon | 264/173 |
| 3,751,539 | 8/1973 | Reuschet et al. | 264/81 |
| 3,867,497 | 2/1975 | Teich et al. | 264/81 |
| 3,943,218 | 3/1976 | Pietze et al. | 264/81 |
| 4,065,533 | 12/1977 | Koppl et al. | 264/81 |

Primary Examiner—Robert F. White
Assistant Examiner—John A. Parrish
Attorney, Agent, or Firm—Allison C. Collard; Thomas M. Galgano

[57] ABSTRACT

A process for deposition of polycrystalline silicon from the gas phase on heated carrier bodies of carbon, which comprises assembling the carrier bodies from extremely thin flexible graphite foils, heating the bodies to deposition temperature, while contacting them with a gaseous mixture containing a decomposable silicon compound and, if desired, hydrogen, and separating the deposited silicon from the carrier body, after termination of the deposition process, by mechanical means. The polycrystalline silicon can either be deposited in the form of shaped hollow bodies for use as laboratory equipment or in the semiconductor industries, or it may be processed to monocrystalline materials.

7 Claims, 17 Drawing Figures

Fig. 1
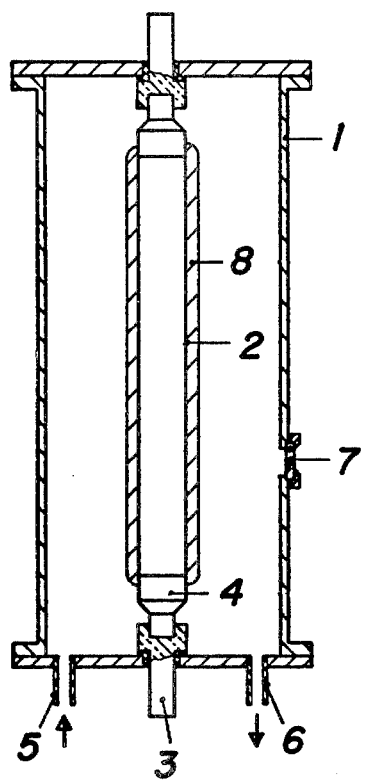
Fig. 1a
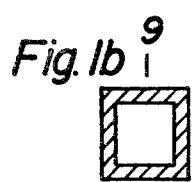
Fig. 1b
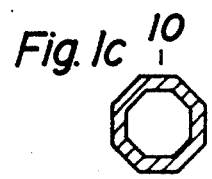
Fig. 1c
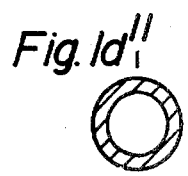
Fig. 1d
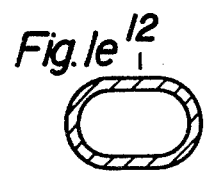
Fig. 1e

22

23

24

25

26

27

PROCESS FOR THE DEPOSITION OF POLYCRYSTALLINE SILICON FROM THE GAS PHASE ON HEATED CARRIERS

The invention relates to a process for the deposition of polycrystalline silicon from the gas phase on heated carrier bodies of carbon.

In high temperature processes of the semiconductor industry, especially in diffusion, oxidation, and epitaxial processes, reactors of silicon are superior to those of quartz because of their higher purity, mechanical stability, and lower gas permeability.

Such silicon bodies can be sawn out of silicon blocks with diamond saws. However, this method is highly time consuming and expensive. That is why attempts have been made for a long time to make shaped bodies by depositing silicon from the gas phase on supports or carriers e.g. of silicon, tantalum or carbon.

The deposition of silicon on carbon or graphite was first successfully carried out in 1927 by R. Hölbling (Zeitschr. anorg. Chemie 40, ps 655–659/1927). By this process, rod shaped solid bodies were made.

According to a process described in German Auslageschrift No. 1,109,142, on the other hand, quartz tubes are used as supports, which are coated on the exterior with a carbon layer, on which hollow silicon bodies are deposited from the gas phase. However, in that process, the separation of the supporting bodies and the shaped silicon bodies causes considerable difficulties.

There is a better way of separating the carrier bodies and shaped silicon, bodies deposited thereon, according to a process described in German Offenbarungsschrift No. 2,215,143, in which carrier bodies of carbon are coated with a layer of SiO$_2$ and subsequently with amorphous silicon before deposition takes place. However, in this process, too, there are narrow limits for the re-use of the carrier bodies; moreover, these bodies have to be carefully polished and newly coated. Also in other cases known from the literature in which shaped bodies of silicon are obtained by deposition of silicon from the gas phase on carrier bodies of carbon or graphite, the re-use of the carrier rarely succeeds and if so, for one or two more times at the most.

The difficulty of separating carbon and silicon i.e. the carrier and the shaped bodies thereon, is partly due to the different expansion coefficients, partly to the brittleness of silicon, which leads not only to the destruction of the carrier body, but frequently also to the disruption of the shaped silicon piece; furthermore, there is the shortcoming that the preparation of the carrier body is time consuming and expensive, since it has to be made from massive blocks of carbon or graphite. These definite disadvantages of all the known processes are the reason why the use of shaped silicon bodies is limited up to now to only a few special fields.

It is the object of the present invention to provide a process which avoids the shortcomings of the known methods in depositing polycrystalline silicon and in making shaped silicon bodies.

It is another object of the invention to provide a process of depositing silicon bodies of various type and shape on carrier bodies. which are inexpensive and readily available.

Other objects and features of the present invention will become apparent from the following detailed description and the accompanying drawings.

The objects of the invention are accomplished by assembling the carrier bodies from flexible planar elements consisting of carbon and having a thickness of 0.1 to 2 mm. On these bodies, silicon is deposited from a gaseous mixture containing a decomposable silicon compound and, most of the time, hydrogen, which passes over the carriers heated to deposition temperature. After the deposition of silicon is completed, it is separated from the carrier by mechanical procedures, e.g., by sand blasting.

Flexible planar elements of carbon in the form of foils, laminates or knitted pieces are available commercially. The knitted pieces consist of filaments of carbon, which are prepared by carbonization of synthetic fibers consisting, e.g., of polyacryl nitrile or polyvinyl alcohol.

Some very suitable materials are graphite foils which according to the producers are made from pure, well-ordered graphite, in which by chemical or thermal treatment the spacing of the planes in the crystal lattice is extended to a multiple of the normal value of 3.35 Å. The resulting light bulk weight consisting of worm-shaped single pieces is treated subsequently on calenders or presses to obtain a final product of higher density. The planes of the graphite lattice and the single pieces of the bulk goods are solidly united by mere mechanical pressure.

Such graphite foils having a thickness of 0.1 to 2 mm, preferably 0.2 to 0.6 mm, which are used for making carrier bodies of shapes of a great variety, can be processed very easily. They can be cut with simple household scissors, be made into the desired shape by bending, and glued together with the conventional carbon adhesives. As "carbon adhesives", glues are advantageously used from which nothing but carbon remains in the solid residue at the high deposition temperatures.

Graphite foils may also be used advantageously, which are coated on one side with an adhesive layer, primarily when they are used in the form of ribbons for making cylindrical carrier bodies. Such cylindrical or curved carriers may be made simply by winding such an adhesive graphite ribbon around a properly shaped dispensable wax mold, care being taken that in the subsequent current passage the cross section of the graphite is as even as possible, that is to say, that parts of the mold with smaller internal diameter have to be superimposed in several layers and glued together. After the wax mold is completely covered by glue, the wax is removed by melting.

Suitable carrier bodies for the production of silicon tubes or pipes are made, e.g., by beating a rectangular piece of foil of proper size to cylindrical shape and gluing it at the longitudinal seam. Another method which leads to more uniform diameters, particularly when using graphite foil of thin walls, consists of helically winding ribbon-shaped foils on rollers, preferably calibrated metallic rollers, and gluing the windings together. The gluing is either performed by letting the edges of the ribbon overlap each other (lap joint) and squeezing the adhesive underneath the overlap, or making the edges abut and covering the seam with a narrow adhesive band (but joint).

Tube-shaped carrier bodies having a circular cross section may further be made in any desired amount and in any length, by pressing together two rollers, one being a steel roller having a diameter corresponding to the internal diameter of the silicon tube to be deposited minus the thickness of the graphite foil, the second roller being used to press onto the first a ribbon-shaped graphite foil surrounding the first roller at a certain pitch. The seams may be glued in a conventional manner or a serrated joint may be formed with a ribbed roller and the unit is finally pressed together.

The process can be carried out continuously in such a manner that the wound-on and glued support tube of graphite is continuously pulled off with a twist from one end of the calibrated roller and is continuously wound onto and glued to the other end. With properly sized, exchangeable calibrated rollers, tubes with any desired internal diameter can be produced. These wound carrier tubes are self-supporting and may be fed onto one end of the calbrated roller and cut off at the other end in any desired length.

In a similar manner, tubes having other than circular hollow cross sections, e.g., oval or elliptic cross sections, may be made. Carrier tubes with a hollow cross section having edges, such as a polygonal cross section, can be obtained by a simple folding of the graphite foil and subsequent gluing of the seams.

For the deposition of silicon, e.g., two such tubes are mounted on electrodes and joined in U-form over a bridge of the same material. The simplest way of forming the bridge is making a tube likewise of graphite foil and cutting into the length of the bridge, two circular holes having an appropriate diameter and being appropriately spaced to accommodate the carrier tubes therein. The bridge can then be simply made by pushing the carrier tubes through the holes.

The process according to the invention is also very suitable for making polycrystalline silicon as starting material for casting or for crucible-drawing according to Czochralski. Whereas this material was made up to now by deposition on monocrystalline thin rods of silicon, wherein the initially deposited amount of silicon per time unit is small and leads to useful amounts only after the deposition carrier grows thicker and affords a larger surface for deposition, with the process according to the invention, for instance, by depositing silicon on the inner surface of hollow cylinders of graphite foil, high deposition rates of polycrystalline silicon are obtained from the start.

It is advisable to discontinue the procedure as soon as half the internal diameter of the deposition cylinder is covered by silicon, because then the deposition rate becomes noticeably lower.

In the deposition proper, the carrier assembly made of graphite, preferably graphite foil, is heated by appropriate heating means, e.g., by direct passage of an electrical current, to about 1050°-1250° C., preferably to 1120°-1180° C., and silicon is deposited on the carrier to the desired wall thickness.

As gas for the deposition, e.g., silicon hydride, monochloro-silane, dichloro-silane, trichloro-silane or tetrachloro-silane may be used, usually in mixture with hyrogen; the preferred compound is trichloro-silane, mixed with hydrogen.

In the accompanying drawings, several modes of carrying out the process according to the invention are illustrated by way of examples. In the drawings, wherein similar reference characters denote similar elements in the several views:

FIG. 1 and FIGS. 1a–1e illustrate the production of silicon tubes having different hollow cross sections;

Figure 2:
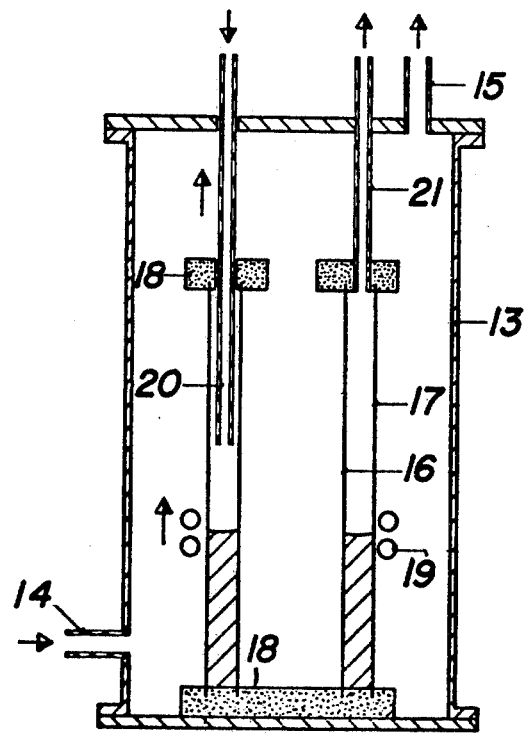
FIG. 2 and FIGS. 2a–2h show the production of silicon tubes having defined cross sections over the entire tube length.
Figure 2G:
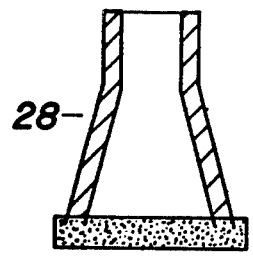

Referring now to FIG. 1, a reactor 1 of quartz or metal is provided into which several carrier tubes 2, preferably built up of graphite foil, are inserted into graphite electrodes 4 mounted on an electrode support 3 consisting, e.g., of silver; the carrier tubes are heated by direct current supply to the deposition temperature of preferably 1120°-1180° C. An inlet pipe for gas to be decomposed is designated by 5 and through this pipe a mixture of trichloro-silane and hydrogen is admitted to the reactor where silicon is deposited on the wall of the carrier tube 2 assembled from graphite foil, until the desired thickness of the deposit is reached. The residual gas mixture remaining after the decomposition of the trichloro-silane is withdrawn from the reactor through a discharge tube 6. In the case of a metal reactor, the course of the decomposition can be observed through an inspection glass 7, made of quartz.

The accurately defined surface of the silicon tube 8 is the inner surface. The hollow cross section is determined by the cross section of the carrier tube. In thin silicon tubes of only a few millimeters wall thickness, the outer surface of the tube cross section will substantially correspond to the inner surface as defined by the carrier tube 2; it may be triangular as shown at 8 in FIG. 1a, square as shown at 9 in FIG. 1b, octagonal as shown at 10 in FIG. 1c, circular as shown at 11 in FIG. 1d, and oval as shown at 12 in FIG. 1e. When silicon tubes with larger wall thicknesses are deposited which require longer periods of deposition, rounded corners will be formed; thus, a silicon tube deposited on a carrier tube with square cross section (FIG. 1b) would show an almost circular outline of the external cross section with a wall thickness from about 7-10 mm. However, apart from the absolute period of deposition, the rate of deposition plays an important role. When the deposition is made to occur at a faster rate, e.g., 2000 g Si/h.m$^2$ the deposited shaped silicon body will approximate the shape defined by the carrier tube more closely than when deposition occurs slowly, for instance, at 200 g Si/h.m$^2$.

After the deposition is terminated, the silicon tubes 8 are taken out of the reactor 1 and the graphite foil is removed by etching, burning off or sand blasting.

In spite of the fact that the anisotropy coefficients of the specific electrical resistance are in the order of about 50–200, no unusual difficulties are encountered with the current supply when the carrier bodies are made of this material.

When silicon hollow bodies are desired in which not only the shape of the cross section is significant, but also an accurately defined outline of the inner and particularly the outer contour has to be observed, it is advisable to proceed as illustrated in FIG. 2.

In that figure, a metal or quartz reactor is designated by 13, equipped with gas admission tube 14 and gas escape tube 15. Two carrier tubes 16 and 17, preferably made of graphite foil, are placed one inside of the other and held together by annular holding members 18. The two carrier tubes 16 and 17 are heated at their bottom ends to deposition temperature, preferably to 1120°-1180° C., e.g., by means of an induction heating coil 19 movable in vertical direction; the coil may be a water-cooled silver coil. Through the upper holding member 18, which may form a lid, a gas injection lance 20, for instance, of quartz, is introduced, through which the deposition gas, e.g., a hydrogentrichloro-silane mixture, is blown into the space between the two graphite tubes 16 and 17. The induction heating coil 19 is pulled upwardly from the bottom of the carrier assembly toward the top at a certain speed which has to correspond to the admission rate of the deposition gas. Thus, the space between the tubes 16 and 17 is filled with silicon gradually from the bottom up. As the deposition zone rises, the quartz lance 20 is retracted toward the top. The remaining gas from the trichloro-silane decomposition is withdrawn through a tube 21.

During the deposition process, the reactor 13 is filled with a protective gas, for instance, argon through tube 14, and the air is expelled through tube 15. The selection of protective gas is of no importance since it does not enter the reaction space proper. The function of the protective gas consists of preventing the rapid oxidation of the zones of the graphite foils heated to deposition temperature. Futhermore, a pressure is generated by the protective gas in the reactor 13, which approximately corresponds to the pressure within the deposition zone between tubes 16 and 17.

After the deposition is terminated, the silicon tube is taken out and the graphite foil adhering to the inside and outside of the shaped silicon body is removed in a conventional manner by etching, burning off or sandblasting.

Figure 2H:
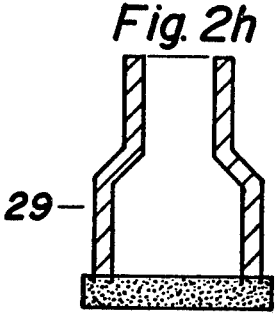
Figure 2A:
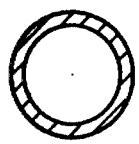
Figure 2B:
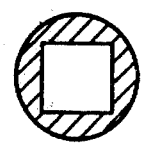
Figure 2C:
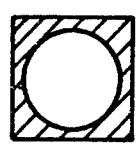
Figure 2D:
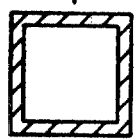
Figure 2E:
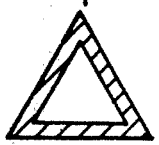
Figure 2F:
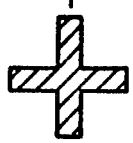

With this variation of the process, hollow silicon bodies may be made having an accurately defined cross section as shown in FIGS. 2a to 2h. FIG. 2a illustrates a circular tube 22; FIG. 2b a tube 23 with circular contour on the outside and square contour on the inside; FIG. 2c a tube 24 square on the outside, circular on the inside; FIG. 2d a tube 25 square throughout; FIG. 2e a tube 26 triangular throughout; and FIG. 2f shows a solid body 27 having a cross-shaped cross section. In the manner described, shaped bodies can be formed having a cross section varying from top to bottom, e.g., a funnel-shaped body 28 of FIG. 2g or a slightly modified funnel 29 as shown in FIG. 2h.

Silicon hollow bodies can be made in this manner which have polished surfaces so that when fitted together, they will be gas-tight. That makes it possible to build laboratory articles from silicon, which have up to now been only made from glass, or quartz, thus making the apparatus more suitable when they are exposed to high temperatures.

When in the deposition process, the exact shape of the silicon body is less important than the rapid production of polycrystalline silicon as starting material for subsequent modification treatments. By way of the silicon melt, modifications of the process according to the invention are shown in FIGS. 3 and 4 which will be better adapted to the purposes just mentioned.

Figure 3:
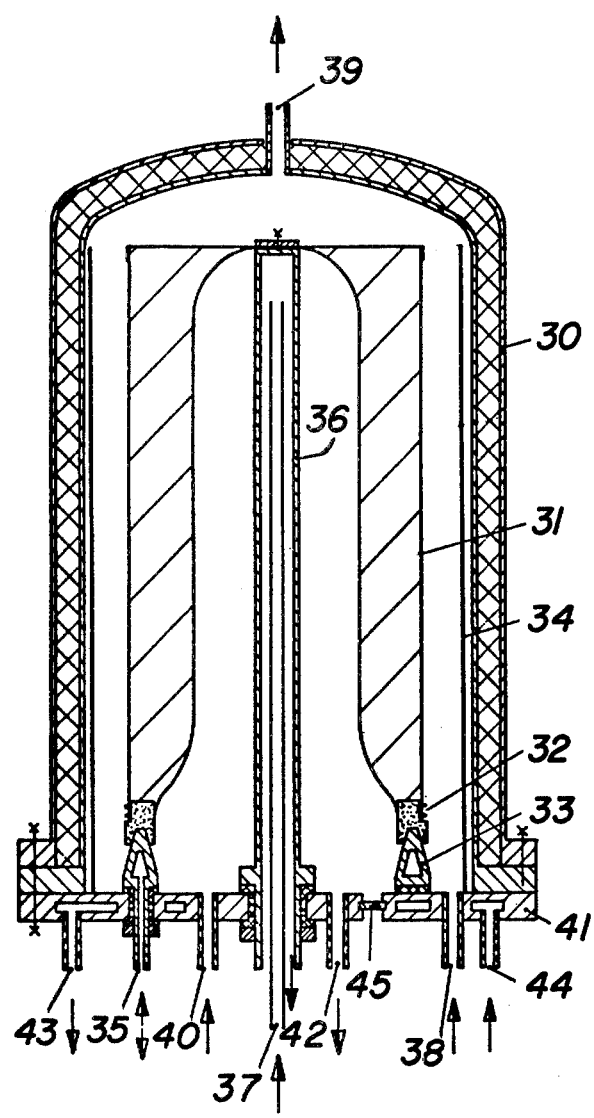
FIG. 3 illustrates the production of polycrystalline silicon as starting material for subsequent casting and crucible-drawing with current passage through the reactor plate at the bottom.
Figure 4:
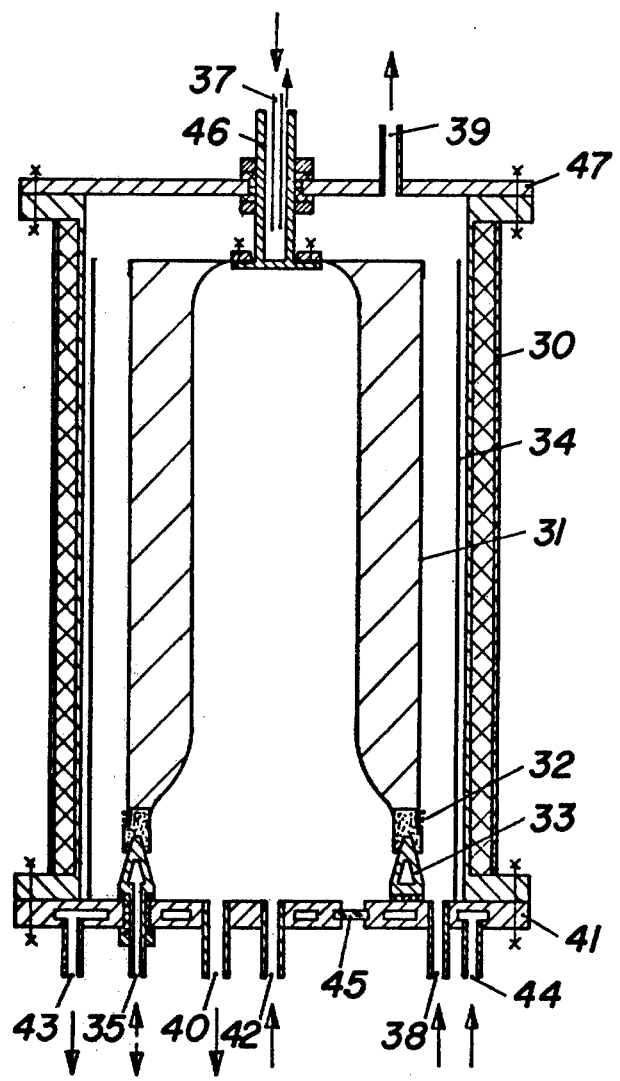
FIG. 4 is a similar view with current passage through the cover plate of the reactor.

Referring now to FIG. 3, a gas tight, heat-insulated reactor 30 is shown e.g. made of high-grade steel, which is covered for instance, with glass wool as insulating sheet against direct heat dissipation to the outside. In the reactor, a hollow cylinder 31 is mounted having a closed top and an open bottom. The cylinder consists of graphite foil and is fastened to an electrically conductive annular member 32 consisting of carbon and having a milled annular groove at the bottom seated on a cooled current supply electrode 33 made of metal, e.g. of silver. It is advantageous to insert between the hollow cylinder 31 and the inner wall of the reactor an additional screen 34, for instance a sheet of molybdenum, to decrease the dissipation of heat. The annular current supply electrode 33, which is hollow, is cooled by a suitable coolant, e.g. water, which is admitted through tube 35. The bottom of the hollow cylinder 31 of graphite foil is connected at the center with a central conductor tube 36, e.g. consisting of silver, said tube acting as current lead-off; it, too, is constantly cooled by a suitable coolant, e.g. water, admitted through a cooling lance 37.

Before the deposition proper is being started, reactor 30 is filled with a protective gas, e.g. argon, admitted by an inlet tube 38, while air is expelled by escape tube 39. As mentioned in connection with the description of FIG. 1, the selection of the protective gas is of no importance, since it does not enter the reaction space proper. The function of the protective gas consists in preventing the rapid oxidation of the hollow cylinder 31 made of graphite foil and heated to deposition temperature by direct passage of current. Moreover, a pressure is generated by the protective gas in the reactor 30 which approximately corresponds to the pressure in the deposition zone inside of hollow cylinder 31.

In the deposition process proper, a gas inlet tube 40 provided in the bottom plate 41 of reactor 30 admits the gas for deposition under a pressure equalling substantially the pressure of the protective gas into the interior of hollow cylinder 31, the cylinder having reached the temperature of about 1050°–1250° C., preferably 1120°–1180° C. by direct passage of current; this results in the deposition of polycrystalline silicon in an increasing layer on the inner wall of the graphite cylinder 31, the silicon taking over the conduction of current to an increasing extent. An even growth of the silicon deposit is insured by the preferably water-cooled central current lead-off at 36, which provides more intense cooling for too rapidly growing areas as compared to areas located at a greater distance. The pressure exerted on the outside of the hollow graphite foil cylinder 31 by the protective gas, as well as the pressure of the gas introduced for deposition, is adjusted to 0–5, preferably to 0.05 to 0.5 bar above outer atmospheric pressure. The residual and the reaction gases escape through the withdrawl conduit 42 in the reactor bottom plate 41. This plate made of e.g. silver-plated steel is substantially hollow, water or some other suitable coolant flowing therethrough via tubes 44 and 43. An inspection glass 45 permits the continuous observation of the deposition process.

As gas for the deposition in principle e.g. the following can be used: silicon hydride, monochloro-silane, dichloro-silane, trichloro-silane, or tetrachloro-silane, usually in mixture with hydrogen; the preferred compound is a mixture of trichloro-silane and hydrogen.

The deposition is best discontinued after half the initial internal diameter is reached; the polycrystalline silicon obtained is freed from the graphite mold by sand-blasting and converted into mono-crystalline material for instance, by the crucible-drawing process according to Czochralski.

FIG. 4 illustrates a very similar device to the one shown in FIG. 3, also used for making polycrystalline silicon, the only difference being that the current is led off at the top through a central conductor tube 46, consisting e.g. of silver-plated steel, by way of the cover plate 47 of the reactor 30. This arrangement differs from the conductor tube 36 in FIG. 3. Otherwise the numerals 30, 31, etc. designate the same structural elements in both figures.

As far as energy is required, the last described modification is more favorable than the one described with reference to FIG. 3, because heat dissipation, which occurs at the central conductor tube 36, is avoided. It is true that the growth of the silicon deposit is not as even as the one described in FIG. 3, but this can be accepted as a rule because the deposited silicon can e.g. be melted down after the graphite layer has been removed, and can be cast into solar cells in thin layers.

For the first time silicon bodies of practically any desired shaped can be made according to the process of the invention in a simple and inexpensive manner.

The process will now be more fully described in a number of examples, which are given by way of illustration and not of limitation.

EXAMPLE 1

A reactor as shown in FIG. 1 consisting of a cylinder of quartz 130 cm high is covered by silver plates at the top and the bottom; 8 carrier tubes of graphite foil are fitted into 8 graphite electrodes mounted on the silver plates. The carrier tubes are wound from a graphite ribbon of 15 cm width and 0.5 mm thickness at a pitch of 45° to form a but joint, i.e. with their edges abutting each other; the helical seam thus formed is covered by a graphite ribbon of 0.2 mm thickness and 3 cm width, glued with a carbon glue, and cut to a length of 100 cm.

Into the reactor, a gas mixture is subsequently introduced for 48 hours, consisting of 93 vol.% hydrogen and 7 vol.% trichlorosilane at a rate of 100 m$^3$/hour.

After the gas mixture had been decomposed at the carrier tubes heated by direct current passage to a temperature of 1150° C., the graphite foil was removed by sand-blasting and silicon tubes were obtained having a uniform wall thickness of 1 cm.

EXAMPLE 2

A reactor as shown in FIG. 2 is used, consisting of a heat-insulated cylinder of high-grade steel having a length of 250 cm and a diameter of 60 cm and being provided with an inspection slit of quartz over the entire longitudinal front. Two massive granite plates cover top and bottom of the cylinder and in these plates two graphite carrier tubes, one placed into the other, are mounted in cut-out grooves, the carrier tubes having a square cross section, the length of each inner side being 10 cm, that of the outer side 12 cm; the length of the carrier tubes is 200 cm. The carrier tubes are made by simply bending a properly cut graphite foil having a thickness of 0.5 mm, and glueing the seam with a strip of graphite foil of 3 mm width and 0.2 mm thickness.

Before starting with the deposition, the reactor is filled with argon as protective gas. A water-cooled induction coil is slowly passed in the course of 15 hours from the bottom over the entire length of the carrier tubes, while the gas for decomposition consisting of 15 vol.% trichloro-silane and 85 vol.% hydrogen is blown into the space between the two carrier tubes. The deposition of silicon occurs gradually at each deposition zone as the induction heating coil travels over the entire length of the carrier tubes and heats said zones. The removal of the graphite foil from the silicon tube having the square diameter is carried out as in Example 1.

EXAMPLE 3

A reactor is used as shown in FIG. 3, consisting of a heat-insulated cylinder of high-grade steel having a length of 120 cm and an internal diameter of 60 cm; it is provided at the inside wall with a molybdenum sheet to prevent dissipation of heat. Into this reactor, a hollow cylinder of graphite foil with an internal diameter of 40 cm and a wall thickness of 0.5 is placed, which is connected at the bottom periphery with a carbon ring seated on an annular, water-cooled silver electrode for current supply. The cover for the top of the hollow cylinder, likewise consisting of graphite foil, is centrally connected with a water-cooled conductor of silver serving for leading off the current.

Subsequently, air is replaced inside and outside of the hollow cylinder by argon and then a gas mixture consisting of 12 vol.% of trichloro-silane and 88 vol.% of hydrogen is introduced into the hollow graphite cylinder heated to 1150° C. by direct passage of current. The argon pressure exerted onto the hollow cylinder from the outside and the pressure of the deposition gas inside the cylinder are adjusted to 0.1 bar above the outer atmospheric pressure.

With a mean intake of 250 standard cubic meters deposition gas per hour, a silicon layer of about 10 cm will be deposited on the inner wall of the hollow cylinder of graphite foil in a period of 48 hours. Since the rate of deposition would now decrease due to the decreasing surface for deposition, the process is discontinued at that time, the cover is withdrawn from the reactor on top, the graphite cylinder with the silicon thereon taken off the electrodes, the graphite foil removed from the deposited silicon by sand-blasting and the obtained silicon is used, after disintegration, as starting product for further processing e.g. for crucible-drawing according to Czochralski.

What is claimed is:

1. An improved process for the deposition of polycrystalline silicon from the gaseous phase on heated carrier bodies of graphite, by heating said bodies to deposition temperature while contacting them with a gaseous mixture containing a decomposable silicon compound and separating the deposited silicon from the carrier body after termination of the deposition process, wherein the improvement comprises: assembling the carrier bodies from thin flexible graphite foils having a thickness of between 0.1–2 mm.

2. The process according to claim 1 wherein the carrier body is made by bending a rectangular piece of graphite foil into cylindrical shape and glueing it together at the seam with a strip made adhesive by application of a carbon glue.

3. The process according to claim 1 wherein the carrier body is made by folding a rectangular piece of graphite foil so as to assume the outline of a polygonal tube, including a triangular tube, and glueing the tube together with an adhesive strip.

4. The process according to claim 1 wherein the carrier body is made by helically winding a ribbon of graphite foil on a roller whose outer diameter equals the inner diameter of the silicon tube to be formed minus the thickness of the graphite foil, and glueing the edges of the ribbon together with a narrow adhesive strip.

5. The process according to claim 1 wherein the carrier body is cylindrical and the silicon is deposited on the inside wall thereof and the process of depositing silicon on the inside wall of the cylindrical carrier is discontinued when a layer of deposited silicon reaches the thickness equalling half the diameter of the carrier.

6. The process according to claim 1 wherein the deposited silicon is produced in the form of a hollow body the shape of which is determined by that of the carrier body, said silicon body being ready, after removal of the carrier body, for direct use in the semiconductor and other industries requiring high-melting materials.

7. The process according to claim 1, wherein the carrier body is made by assembling two tubes of flexible graphite foil of different diameters, placing the tubes inside one another so as to leave an annular space therebetween, and arranging the tubes in a generally vertical disposition, wherein said heating and contacting steps are effected by introducing the gaseous mixture into said space from one end of said tubes, heating the tubular bodies by means of a vertically-moveable heating device which is moved upwardly from the other end of said tubes to said one end of said tubes so as to deposit silicon in said annular space between said tubes substantially progressively from said other end of said tubes to said one end of said tubes, and, wherein said separating step is effected by removing after termination of the depositing step, the graphite foil tubes from the inside and outside walls of the deposited silicon tube by sandblasting.

* * * * *